United States Patent
Beggiora

(10) Patent No.: US 10,673,234 B2
(45) Date of Patent: Jun. 2, 2020

(54) POWER COMMUNICATION ARCHITECTURE FOR AN AIRCRAFT

(71) Applicant: ZODIAC AERO ELECTRIC, Montreuil (FR)

(72) Inventor: Geoffrey Beggiora, Montreuil (FR)

(73) Assignee: ZODIAC AERO ELECTRIC, Montreuil (FR)

(*) Notice: Subject to any disclaimer, the term of this patent is extended or adjusted under 35 U.S.C. 154(b) by 0 days.

(21) Appl. No.: 15/878,126

(22) Filed: Jan. 23, 2018

(65) Prior Publication Data
US 2018/0219378 A1 Aug. 2, 2018

(30) Foreign Application Priority Data

Jan. 24, 2017 (FR) ...................................... 17 00064
Jun. 13, 2017 (FR) ...................................... 17 55301

(51) Int. Cl.
*H02J 3/14* (2006.01)
*H02J 1/00* (2006.01)
(Continued)

(52) U.S. Cl.
CPC ................ *H02J 3/14* (2013.01); *B64C 13/04* (2013.01); *B64C 13/50* (2013.01); *H02J 1/00* (2013.01);
(Continued)

(58) Field of Classification Search
CPC ........ H02J 3/14; H02J 1/00; H02J 5/00; H02J 13/00; B64C 13/04; B64C 13/50;
(Continued)

(56) References Cited

U.S. PATENT DOCUMENTS 7,737,577 B2* 6/2010 Langlois .................. H02J 1/10
307/19
8,840,070 B2* 9/2014 Boucaud ................. B64C 13/50
244/228
(Continued)

FOREIGN PATENT DOCUMENTS

| FR | 2 907 760 A1 | 5/2008 |
|---|---|---|
| WO | 2007113312 A1 | 10/2007 |
| WO | 2011157834 A2 | 12/2011 |

OTHER PUBLICATIONS

Preliminary Search Report and Written Opinion for French Patent Application No. 1755301, dated Dec. 5, 2017, 7 pages.

*Primary Examiner* — Hal Kaplan
(74) *Attorney, Agent, or Firm* — Christensen O'Connor Johnson Kindness PLLC

(57) ABSTRACT

The invention relates to a power communication architecture (100) for an aircraft comprising:
a power electronics module management unit (103) that is capable of receiving input signals (104) and of delivering a current setpoint (106);
at least one power electronics module (107) that is capable of receiving said current setpoint (106);
at least one load (105) that is controlled by the at least one power electronics module (107);
the power electronics module management unit (103) storing control laws (108) for controlling the one or more loads (105) allowing a current setpoint (106) to be transmitted according to the input signals (104) and said control laws (108).
The invention also relates to an electrical distribution device for an aircraft comprising at least one such architecture.

7 Claims, 4 Drawing Sheets

(51) Int. Cl.
    *H02J 5/00*     (2016.01)
    *H02J 13/00*     (2006.01)
    *B64C 13/50*     (2006.01)
    *B64C 13/04*     (2006.01)
    *H02M 1/10*     (2006.01)
    *H02M 5/44*     (2006.01)
    *H02M 7/493*     (2007.01)

(52) U.S. Cl.
    CPC ............... *H02J 5/00* (2013.01); *H02J 13/00* (2013.01); *H02M 1/10* (2013.01); *H02M 5/44* (2013.01); *H02M 7/493* (2013.01); *B64D 2221/00* (2013.01)

(58) Field of Classification Search
    CPC .......... H02M 1/10; H02M 5/44; H02M 7/493; B64D 2221/00
    USPC .......................................................... 307/31
    See application file for complete search history.

(56) References Cited

U.S. PATENT DOCUMENTS

2008/0211237 A1\*   9/2008   Berenger ................ H02J 3/12
                                                                                 290/40 B
2009/0091187 A1\*   4/2009   Tardy ..................... H02J 3/14
                                                                                 307/38

\* cited by examiner

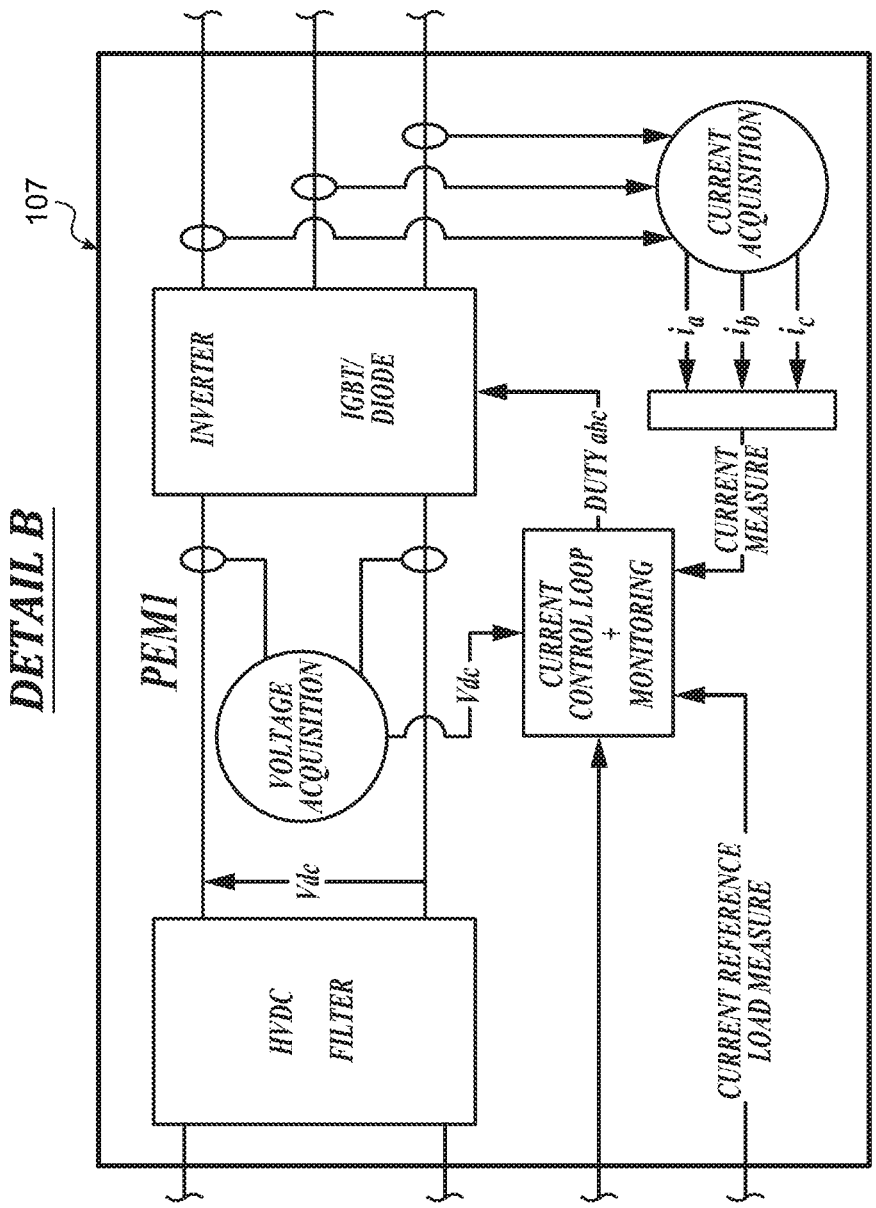

POWER COMMUNICATION ARCHITECTURE FOR AN AIRCRAFT

The invention relates to a power communication architecture for an aircraft that is liable to hold mutually shared power electronics on board, as well as an electrical distribution device for an aircraft comprising at least one such architecture.

The majority of electrical networks for aircraft, in particular for aeroplanes, possess a 115 VAC or 230 VAC three-phase electrical network having a fixed frequency at 400 Hz or a variable frequency from 350 Hz to 800 Hz and a 28 VDC DC network.

With the advent of power electronics and mechatronics, certain functions that were conventionally performed using hydraulic or pneumatic energy are now performed using electrical energy. To achieve this, these devices interface with the three-phase network, transform this network into a DC bus, creating a rectifier function, and transform this DC bus into a new three-phase network that can be voltage- and frequency-controlled, creating an inverter function, to supply an electrical actuator with power. In addition, EMC filters are installed so as to observe EMC standards.

The actuator is controlled by the power electronics by executing, in a conventional manner, a current control loop that is nested within a torque, speed or power control loop depending on the desired outcome.

An electrical energy distribution architecture that consists in distributing +/−270 VDC DC electrical energy is known. The power electronics may in this case do without the rectifier. In addition, this architecture proposes mutually sharing the power electronics, since they are never all used at the same time. There are therefore fewer power electronics packages than there are actuators or electrical loads. The electrical connection between the power electronics and the loads is made using a matrix of contactors distributing the power phases of the power electronics to the actuators or to the loads.

Such a power communication architecture 1 for an aircraft is shown in FIGS. 1 and 1A. An electronic circuit board 3 bearing a unit referred to as a "PEMMU", which stands for "power electronics module management unit", performs the acquisition of the sensors of all of the loads 5 and retransmits them in real time to power electronics modules, referred to as "PEMs", 7 that have need thereof. An electronic circuit board bearing a unit 9 referred to as an "ENMU", which stands for "electrical network management unit", sets up the PEM module 7/load 5 association, configures the matrix of contactors 11 and transmits this information to the PEMMU unit 3. The ENMU unit 9 also transmits the setpoints for the loads, such as the speed, torque and voltage setpoints. The PEM modules 7 each host all of the control laws for controlling all of the loads 5 and execute the correct law according to the order coming from the PEMMU unit 3. The control laws are composed of two nested control loops: one rapid loop controlling the current, nested within a voltage, torque, speed or power loop depending on the load 5, which transmits a current setpoint to the current loop.

The addition of the matrix of contactors 11 is compensated for by optimizing the number of PEM modules 7, thereby allowing weight to be saved with respect to the overall budget of the aircraft. Furthermore, the architecture 1 allows the availability of critical functions to be increased since the loss of one power electronics unit no longer leads to the loss of the function.

However, the control architecture is made more complex. In terms of monitoring and controlling the actuators, it is necessary for all of the PEM modules 7 to have access to the sensors of all of the loads 5 and each to host the control laws for controlling all of the loads 5. In addition, multiple PEM modules 7 may be recruited to operate in parallel on one and the same load 5, thereby necessitating communication between the power electronics units.

Furthermore, the PEM modules 7 must incorporate greater intelligence, entailing more development and integration issues. Lastly, it is not possible to monitor or to track the loads 5 that are not assigned to one or more PEM modules 7.

There is therefore a need to improve the operation of the architecture described above, in particular to simplify the control of said architecture.

According to a first aspect, one subject of the invention is a power communication architecture for an aircraft comprising:
- a power electronics module management unit that is capable of receiving input signals and of delivering a current setpoint;
- at least one power electronics module that is capable of receiving said current setpoint;
- at least one load that is controlled by the at least one power electronics module;
- the power electronics module management unit storing control laws for controlling the one or more loads allowing a current setpoint to be transmitted according to the input signals and said control laws.

According to particular embodiments of the invention, the architecture of the invention may comprise one or more of the following features, taken alone or in any possible combination:
- the architecture of the invention comprises an electrical network management unit that is configured to communicate with the power electronics module management unit and to set up the association between the power electronics module and the load;
- the architecture comprises a contactor matrix that is configured by the electrical network management unit, said contactor matrix being capable of communicating with each power electronics module and each load;
- the electrical network management unit is comprised within the power electronics module management unit;
- the architecture of the invention comprises at least one current sensor that is configured to measure the current from a power electronics module to the power electronics module management unit;
- the at least one current sensor is incorporated within the power electronics module management unit;
- the control laws of the power electronics module management unit incorporate the current loops of the power electronics modules.

According to another aspect, another subject of the invention is an electrical distribution device for an aircraft comprising at least one architecture according to the invention.

By virtue of the invention, the control laws are grouped together in a single component, namely the PEMMU unit, unlike in the prior art where each PEM power electronics module hosts its own control law. Thus, the board bearing the PEMMU unit is produced by a single supplier, thereby decreasing development costs.

The interfaces are also simplified and homogenized since the current setpoint passes only between the PEMMU unit and the PEM power electronics modules.

The communication architecture is also simplified since the parallel connection buses between the PEM modules are omitted.

The device integration phase is simplified since there is a single interface for tuning the control laws and it is therefore no longer necessary to test said laws in all of the PEM modules.

The PEM modules are homogenized and simplified.

The hardware and software are mutually shared by incorporating modular power electronics.

The loads can be continuously monitored or tracked in the PEMMU unit even if the loads are not associated with one or more PEM modules. There are therefore no longer any dormant loads, thereby increasing safety.

Other aims, features and advantages of the invention will become apparent upon reading the following description, provided solely by way of non-limiting example and with reference to the appended drawings, in which:

FIGS. 2 and 2A are partial block diagrams of the architecture according to one embodiment of the invention.

Figure 1:
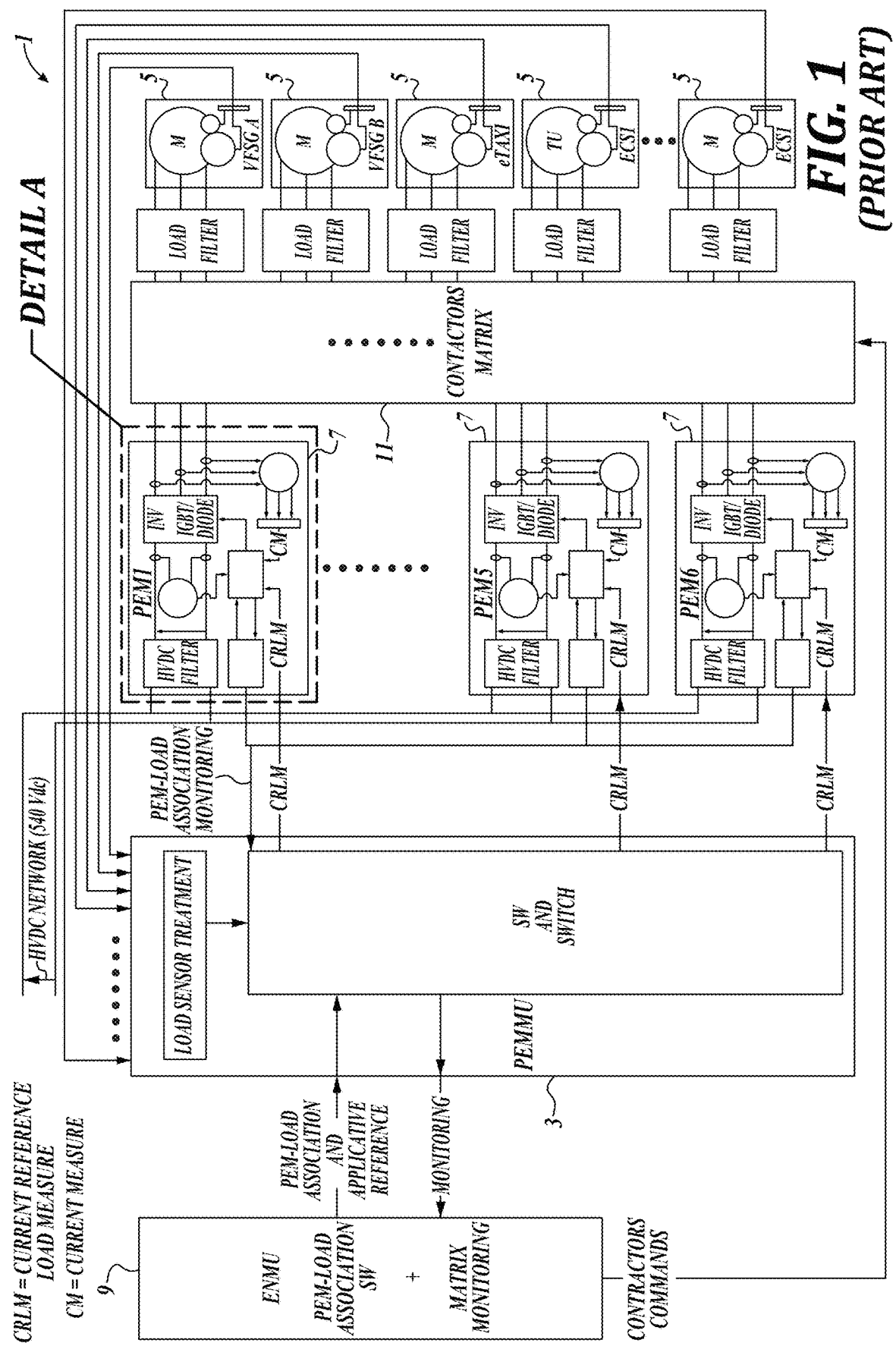
FIGS. 1 and 1A are partial block diagrams of the architecture of the prior art.
Figure 1A:
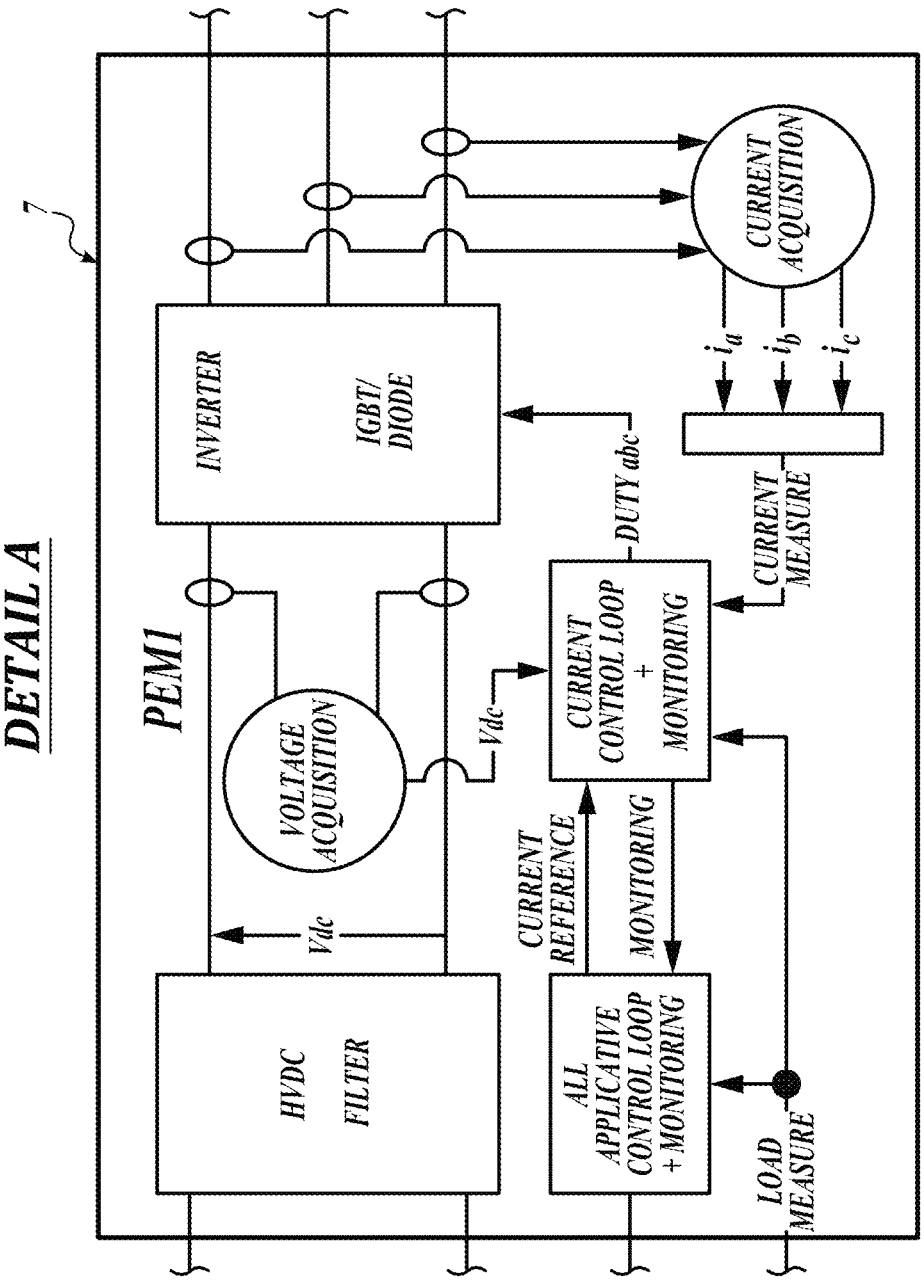
Figure 2:
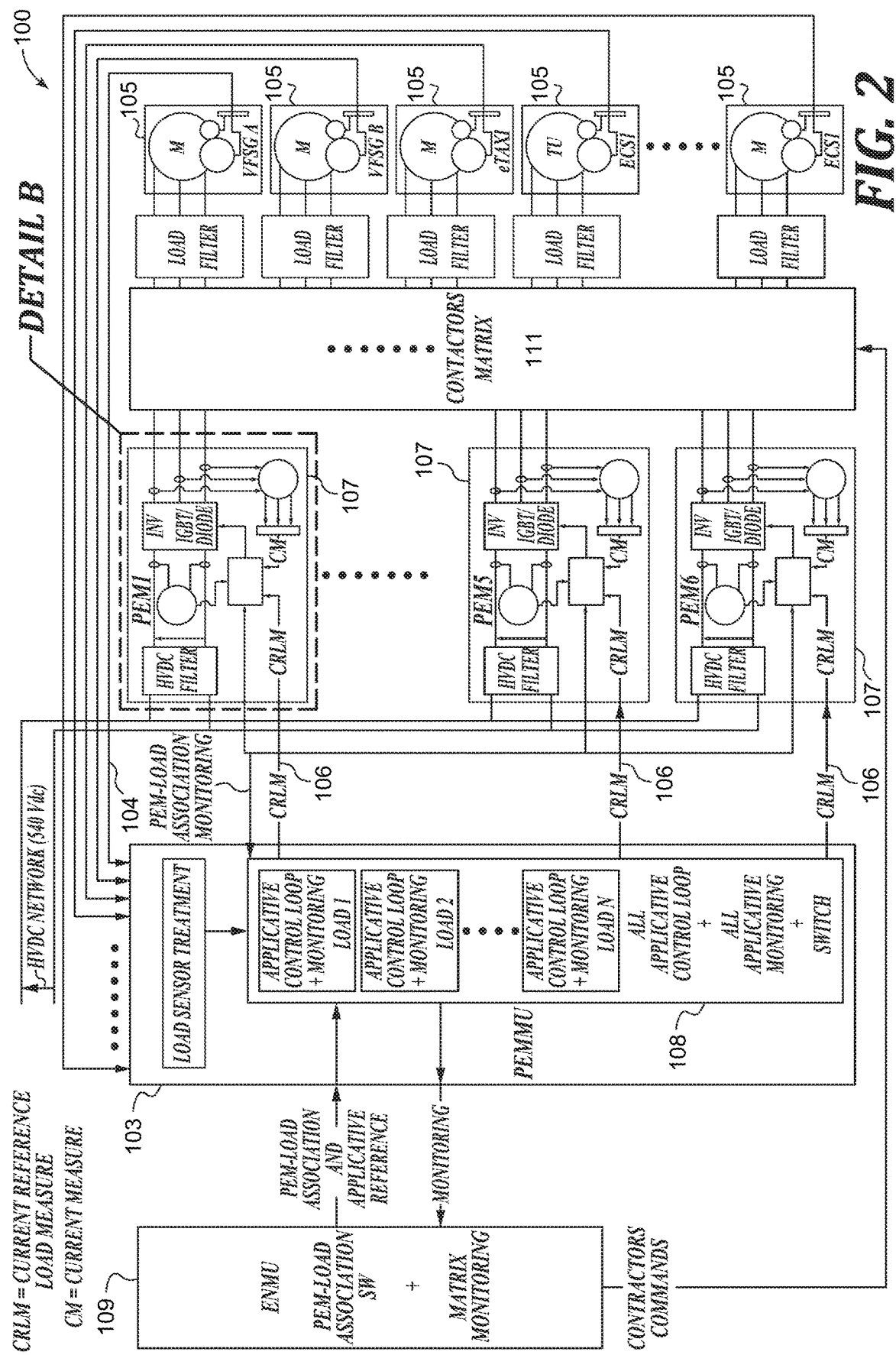

As illustrated in FIG. 2, the power communication architecture 100 according to the invention comprises:

a PEMMU power electronics module management unit 103 that is capable of receiving input signals 104 and of delivering a current setpoint 106;

at least one PEM power electronics module 107 that is capable of receiving said current setpoint 106;

at least one load 105 that is controlled by the at least one PEM module 107.

The PEMMU unit 103 stores control laws 108 for controlling the one or more loads 105 allowing a current setpoint 106 to be transmitted according to the input signals 104 and said control laws 108.

By virtue of the invention, the control of the architecture 100 is simplified by virtue of grouping together all of the control laws for controlling the loads 105 within a single component, namely the PEMMU unit 103.

According to the embodiment shown in FIG. 2, the architecture 100 comprises an ENMU electrical network management unit 109 that is configured to communicate with the PEMMU unit 103 and to set up the association between the PEM module 107 and the load 105.

The architecture 100 may also comprise a contactor matrix 111 that is configured by the ENMU unit 109, said contactor matrix 111 being capable of communicating with each PEM module 107 and each load 105.

The ENMU unit 109 may be comprised within the PEMMU unit 103.

The architecture 100 may comprise at least one current sensor (not shown) that is configured to measure the current from a PEM module 107 to the PEMMU unit 103.

The PEMMU unit 103 may incorporate the current loops of the PEM modules 107 and send the result of the current loops to each PEM module 107.

In the embodiment shown in FIG. 2, the PEMMU unit 103 still performs the acquisition of the sensors of all of the loads 105 but said PEMMU unit also hosts all of the control laws for controlling the loads 108. Said PEMMU unit 103 receives an input signal, in particular setpoints for the loads 105 such as the speed setpoints, a torque or a voltage arising from the ENMU unit 109, and data 104 from the sensors of the loads 105. Said PEMMU unit 103 is then capable of executing the control laws 108 for controlling the loads 105.

These control laws 108 generate, as output, a current setpoint 106 that is sent to one or more affected PEM modules. The ENMU unit 109 sets up the PEM module 107/load 105 association, configures the matrix of contactors 111 and transmits this information to the PEMMU unit 103. The PEM modules 107 solely have, in this architecture, the rapid current loop which has, as input, the current setpoint that is sent by the PEMMU unit 103 and the current measurements that are made directly in the PEM module 107.

The architecture 100 of the invention may include one or more rapid communication buses for rapid communication between the PEMMU unit 103 and the PEM modules 107. Said buses allow the current setpoint and the position of the assigned load 105 to be sent to the PEM module 107 if necessary.

The communication bus for communication between the PEM modules 107 is omitted since the parallel connection of the PEM modules 107 may be managed directly at the level of the PEMMU unit 103 in the control laws 108.

The invention also relates to an electrical distribution device (not shown) for an aircraft comprising at least one architecture according to the invention.

The invention claimed is:

1. A power communication architecture for an aircraft comprising:

a power electronics module management unit (PEMMU) that is capable of receiving input signals and of delivering a current setpoint;

at least one power electronics module (PEM) that is capable of receiving said current setpoint; and at least one load that is controlled by the at least one power electronics module;

the power electronics module management unit storing control laws for controlling the at least one load allowing a current setpoint to be transmitted according to the input signals and said control laws.

2. The power communication architecture according to claim 1, further comprising an electrical network management unit (ENMU) that is configured to communicate with the power electronics module management unit and to set up associations between the at least one power electronics module and the at least one load.

3. The power communication architecture according to claim 2, further comprising a contactor matrix that is configured by the electrical network management unit, said contactor matrix being capable of communicating with each power electronics module and each load.

4. The power communication architecture according to claim 2, wherein the electrical network management unit is comprised within the power electronics module management unit.

5. The power communication architecture according to claim 1, wherein the at least one current sensor is incorporated within the power electronics module management unit.

6. The power communication architecture according to claim 1, wherein the control laws of the power electronics module management unit incorporate the current loops of the power electronics modules.

7. An electrical distribution device for an aircraft comprising at least one power communication architecture according to claim 1.

* * * * *